Figure 1:
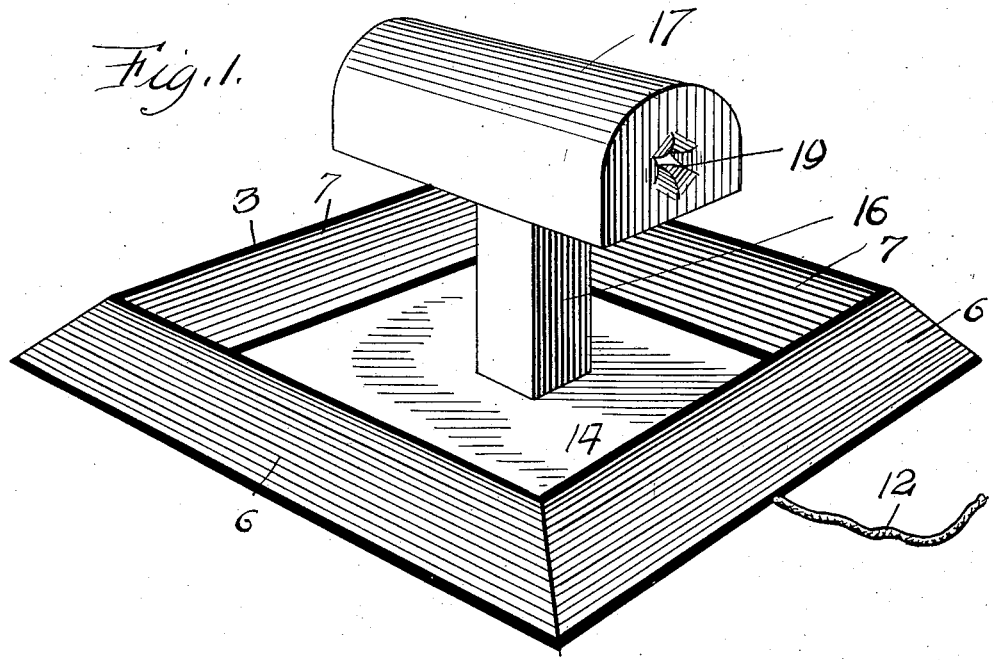

J. BALINT.
ELECTRIC RAT TRAP.
APPLICATION FILED DEC. 29, 1911.

1,024,967.

Patented Apr. 30, 1912.

WITNESSES
Samuel Payne
K. H. Butler

INVENTOR
J. Balint.
BY
N. C. Evert & Co.
ATTORNEYS

UNITED STATES PATENT OFFICE.

JOHN BALINT, OF CINCINNATI, OHIO.

ELECTRIC RAT-TRAP.

1,024,967. Specification of Letters Patent. Patented Apr. 30, 1912.

Application filed December 29, 1911. Serial No. 668,512.

*To all whom it may concern:*

Be it known that I, JOHN BALINT, a subject of the King of Hungary, residing at Cincinnati, in the county of Hamilton and State of Ohio, have invented certain new and useful Improvements in Electric Rat-Traps, of which the following is a specification, reference being had therein to the accompanying drawing.

This invention relates to an electric rat trap, and the object of my invention is to provide a simple and durable trap wherein electricity is utilized for shocking and electrocuting rats and other rodents that attempt to obtain the bait arranged within the trap.

I attain the above object by a rectangular frame that has electrodes or contact plates normally in an open circuit, the electrodes or contact plates being exposed upon the sides of the frame and centrally of the frame there is a bait housing containing a suitable bait adapted to entice rats or other rodents to the trap. In attempting to obtain the bait, it is necessary that the rats or rodents tread upon the electrodes or contact plates, thus completing the circuit between the electrodes or contact plates and electrocute the rodent.

The invention will be hereinafter specifically described and then claimed, and reference will now be had to the drawing, wherein:—

Figure 2:
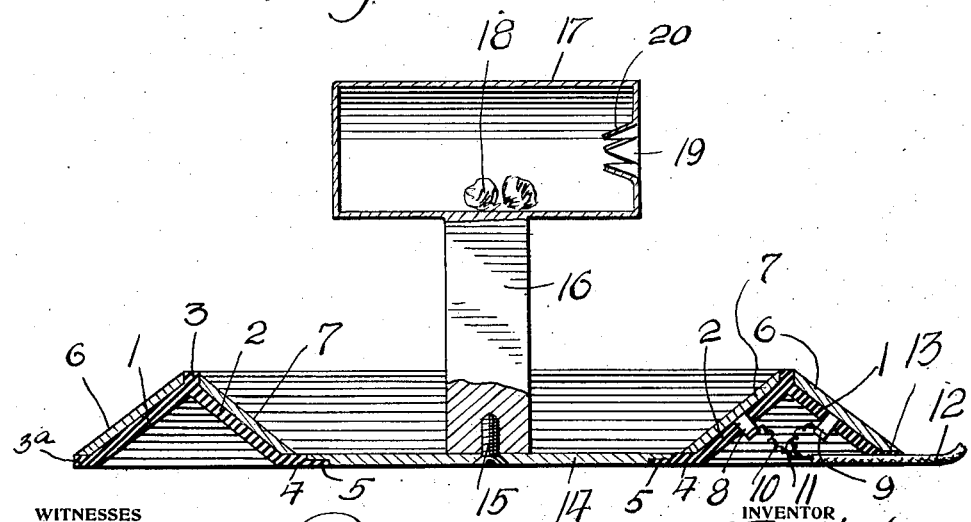

Figure 1 is a perspective view of the trap, and Fig. 2 is a longitudinal sectional view of the same.

A trap in accordance with this invention comprises a rectangular frame having inclined inner and outer walls 1 and 2 that have the upper edges thereof integral and terminating in a rib 3. The walls 1 and 2 are of an inverted V-shaped formation and the lower edges of the walls 1 and 2 are provided with longitudinal flanges 3ᵃ and 4 respectively, the flanges 4 of the walls 2 being chamfered to provide a seat 5. The rectangular frame is made of an insulating material, as wood, fiber or rubber.

Mounted upon the walls 1 and 2 are electrodes or metallic contact plates 6 and 7 respectively having the longitudinal edges thereof beveled to engage the ribs 3 and the flanges 3ᵃ and 4. The electrodes or metallic contact plates 6 and 7 form frames that are easily and quickly placed in position, and the plates 6 and 7 at one side of the trap are provided with binding posts 8 and 9 respectively that extend through the walls 1 and 2. The binding posts 8 and 9 are connected to wires 10 and 11 respectively and these wires are incased in a conduit 12 of insulation, said conduit extending through a groove or opening 13 provided therefor in the flange 3ᵃ of the wall 1. The wires 10 and 11 are connected to a suitable source of electrical energy, as a generator or batteries (not shown), of sufficient energy to electrocute a rodent.

Arranged upon the seat 5 of the flanges 4 is a rectangular center plate 14 made of wood or other insulation material, and secured centrally of said plate by a screw 15 or other fastening means is a pedestal or post 16 having the upper end thereof provided with a bait holder or housing 17 adapted to contain a bait 18. One end of the holder or housing is provided with an opening 19 and inwardly projecting prongs 20. The opening 19 permits of the bait being placed within the holder, and should a rodent be able to jump on to the holder and enter the opening 19, it is impossible for the rodent to escape.

The trap has been designed whereby a rodent in attempting to obtain the bait will bridge and connect the electrodes or metallic contact plates 6 and 7, and thereby complete a circuit between said plates.

What I claim is:—

An electric rat trap comprising a rectangular frame of insulating material and of inverted V-shape in cross section at any point throughout its length, said frame at the apex thereof provided with a rectangular rib extending entirely around the same, said frame further having the bottom thereof at each side formed with a flange, metallic plates mounted upon the outer face of said frame at both sides thereof and abutting against said rib and said flanges, binding posts carried by said plates and extending through said frame into the interior thereof, leading-in-wires attached to said binding posts, a center plate of insulating material secured to the inwardly extending flanges of said frame, a pedestal attached to said center plate, and a bait holder mounted upon said pedestal.

In testimony whereof I affix my signature in the presence of two witnesses.

JOHN BALINT.

Witnesses:
 ANDRÁS KATONA,
 E. B. DAULTON.

Copies of this patent may be obtained for five cents each, by addressing the "Commissioner of Patents, Washington, D. C."